US011780269B2

(12) United States Patent
Takahashi et al.

(10) Patent No.: US 11,780,269 B2
(45) Date of Patent: Oct. 10, 2023

(54) PNEUMATIC TIRE FOR MOTORCYCLE

(71) Applicant: BRIDGESTONE CORPORATION, Tokyo (JP)

(72) Inventors: Junichi Takahashi, Tokyo (JP); Mitsunori Uchida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 541 days.

(21) Appl. No.: 16/740,565

(22) Filed: Jan. 13, 2020

(65) Prior Publication Data
US 2020/0148007 A1 May 14, 2020

Related U.S. Application Data

(63) Continuation of application No. PCT/JP2018/023880, filed on Jun. 22, 2018.

(30) Foreign Application Priority Data

Jul. 14, 2017 (JP) ................................. 2017-138028

(51) Int. Cl.
*B60C 11/03* (2006.01)
*B60C 11/13* (2006.01)

(52) U.S. Cl.
CPC ...... *B60C 11/0302* (2013.01); *B60C 11/1323* (2013.01); *B60C 2011/0372* (2013.01); *B60C 2200/10* (2013.01)

(58) Field of Classification Search
CPC ....... B60C 2200/10; B60C 11/13–1392; B60C 11/0302
See application file for complete search history.

(56) References Cited

U.S. PATENT DOCUMENTS

2013/0228256 A1* 9/2013 Shibamoto .......... B60C 11/0304
152/209.8
2014/0311639 A1 10/2014 Aoki et al.
(Continued)

FOREIGN PATENT DOCUMENTS

CN 101734110 A 6/2010
EP 2181864 A1 5/2010
(Continued)

OTHER PUBLICATIONS

JP 2007-210384 Machine Translation; Hirano, Takashi (Year: 2007).*
(Continued)

*Primary Examiner* — Robert C Dye
*Assistant Examiner* — Nicholas J Weiler
(74) *Attorney, Agent, or Firm* — Sughrue Mion, PLLC (57) ABSTRACT

Provided is a motorcycle pneumatic tire in which the wet grip performance is improved while the steering stability during turning is ensured. The motorcycle pneumatic tire includes, on its ground-contact surface: a first inclined groove (21) that extends on a tire width-direction outer side from the vicinity of a tire equator and is inclined in the same direction as a tire rotation direction; and a short groove (22) that is arranged on the extension of a tire width-direction outer end of the first inclined groove (21). The tire width-direction outer end of the first inclined groove is positioned in the vicinity of a point at ¼ of a tread width (TW) from the tire equator on the tire width-direction outer side, while a tire width-direction inner end of the short groove is positioned in a range of ¼ to 5/16 of the tread width (TW) from the tire equator on the tire width-direction outer side; an inclination angle of the first inclined groove with respect to a tire circumferential direction increases toward the tire width-direction outer side; and an angle $\theta_A$ formed by a groove wall of the tire width-direction outer end of the first (Continued)

inclined groove with respect to the direction perpendicular to the tire surface, and an angle $\theta_B$ formed by a groove wall of the tire width-direction inner end of the short groove with respect to the direction perpendicular to the tire surface, satisfy a relationship of $\theta_A > \theta_B$.

8 Claims, 4 Drawing Sheets

(56) References Cited

U.S. PATENT DOCUMENTS

| | | | |
|---|---|---|---|
| 2016/0221399 | A1 | 8/2016 | Otani et al. |
| 2018/0326791 | A1 | 11/2018 | Hayashi et al. |
| 2019/0168543 | A1* | 6/2019 | Kobori .................. B60C 11/12 |
| 2019/0176525 | A1* | 6/2019 | Nakagawa ............. B60C 11/12 |

FOREIGN PATENT DOCUMENTS

| | | | |
|---|---|---|---|
| JP | 2007210384 A | * | 8/2007 |
| JP | 2010-184539 A | | 8/2010 |
| JP | 2012-153318 A | | 8/2012 |
| JP | 2012-162160 A | | 8/2012 |
| JP | 2014-210470 A | | 11/2014 |
| JP | 2016-141226 A | | 8/2016 |
| WO | 2013/084436 A1 | | 6/2013 |
| WO | 2016/051642 A1 | | 4/2016 |

OTHER PUBLICATIONS

JP 2012-153318 Machine Translation; Mizuguchi, Kaoi (Year: 2012).*
Search Report dated Jun. 2, 2021, from the China National Intellectual Property Administration in application No. 2018800467208.
Extended European Search Report dated Dec. 16, 2020 from the European Patent Office in EP Application No. 18831767.1.
International Search Report for PCT/JP2018/023880 dated Aug. 28, 2018 (PCT/ISA/210).

* cited by examiner

FIG. 4

PNEUMATIC TIRE FOR MOTORCYCLE

CROSS REFERENCE TO RELATED APPLICATIONS

The present application is a continuation of PCT/JP2018/023880 filed Jun. 22, 2018 which claims priority to Japanese Patent Application No. JP2017-138028 filed Jul. 14, 2017, the disclosures of which are incorporated herein by reference.

TECHNICAL FIELD

The present invention relates to a motorcycle pneumatic tire (hereinafter, also simply referred to as "tire"), more particularly a motorcycle pneumatic tire pertaining to an improvement of a tread portion.

BACKGROUND ART

Two-wheeled vehicles have a characteristic of making turns by tilting the vehicle body, which is different from four-wheeled vehicles such as passenger cars, trucks and buses; therefore, motorcycle pneumatic tires have a shape in which the crown section has a smaller radius of curvature with a rounder cross-section as compared to four-wheeled vehicle tires. In other words, in a motorcycle pneumatic tire, a tread central portion mainly comes in contact with the ground during straight running of motorcycle, while a tread shoulder portion comes in contact with the ground during turning.

In association with these characteristics of motorcycle pneumatic tires, in the tread patterns of motorcycle pneumatic tires, the groove width is set to be narrower at, for example, about 4 to 5 mm, than in tires of other types so as to make it easier to design land portions. In addition, in order to ensure a balance of the rigidity during straight running of the motorcycle and to improve the drainage performance, the inclination angle of grooves with respect to the tire circumferential direction in the tire central portion is set to be small, and tends to increase toward the tire shoulder portions so as to ensure lateral rigidity.

As a prior art relating to a motorcycle pneumatic tire, for example, Patent Document 1 discloses a motorcycle pneumatic tire in which: a large number of first inclined grooves inclining across an equatorial plane are arranged at intervals along the circumferential direction within a range of the surface coming into contact with the ground during straight running; second inclined grooves that correspond to the respective first inclined grooves and have the same inclination directions with respect to the equatorial plane as those of the corresponding first inclined grooves are arranged at positions away from the respective first inclined grooves on the outer ground-contact surface on one side; a limited length part of a widthwise center line of each first inclined groove and a limited length part of a widthwise center line of the corresponding second inclined groove are both on a common curved line whose positive/negative direction of curvature does not change; an projection image of each first inclined groove and that of the corresponding second inclined groove on a plane passing through the tire axis are separated from each other by a distance α in the tire axial direction; and an projection image of each first inclined groove and that of the corresponding inclined groove on the equatorial plane overlap with each other over a length β in the tire circumferential direction.

RELATED ART DOCUMENT

Patent Document

[Patent Document 1] JP2010-184539A (Claims, etc.)

SUMMARY OF THE INVENTION

Problems to be Solved by the Invention

One important performance of a motorcycle pneumatic tire is the wet grip performance during turning of motorcycle. In this respect, conventionally, mainly the ratio of grooves in a tread pattern is increased and the low-temperature loss of a tread rubber is improved; however, these methods have a problem of having a large adverse effect on the wear performance. In Patent Document 1, the grip performance and the wet performance are both satisfied by appropriately arranging plural inclined grooves inclining across the equatorial plane within a range of the surface coming into contact with the ground during straight running; however, the wet grip performance during turning is not examined. Further, in motorcycle pneumatic tires, it is also important to ensure the steering stability during turning of motorcycle.

In view of the above, an object of the present invention is to provide a motorcycle pneumatic tire in which the wet grip performance during turning is improved while the steering stability during turning is ensured without such an adverse effect on the wear performance as in the prior art.

Means for Solving the Problems

The present inventors intensively studied to discover that the above-described problems can be solved by arranging prescribed grooves on the tire ground-contact surface under prescribed conditions, thereby completing the present invention.

That is, the present invention is a motorcycle pneumatic tire including: a pair of bead portions; a pair of side wall portions continuously extending on the respective bead portions; a tread portion toroidally extending between the side wall portions; at least one carcass reinforcing the respective portions between the pair of the bead portions; and a designated rotation direction when mounted on a motorcycle, the motorcycle pneumatic tire being characterized in that the motorcycle pneumatic tire further includes, on its ground-contact surface: a first inclined groove extending on a tire width-direction outer side from the vicinity of a tire equator and being inclined in the same direction as the tire rotation direction; and a short groove arranged on an extension of a tire width-direction outer end of the first inclined groove, the tire width-direction outer end of the first inclined groove is positioned in the vicinity of a point at ¼ of a tread width TW from the tire equator on the tire width-direction outer side, while a tire width-direction inner end of the short groove is positioned in a range of ¼ to ⁵⁄₁₆ of the tread width TW from the tire equator on the tire width-direction outer side, an inclination angle of the first inclined groove with respect to a tire circumferential direction increases toward the tire width-direction outer side, and an angle $\theta_A$ formed by a groove wall of the tire width-direction outer end of the first inclined groove with respect to the direction perpendicular to the tire surface, and an angle $\theta_B$ formed by a groove wall of the tire width-direction inner end of the short groove with respect to the direction perpendicular to the tire surface, satisfy a relationship of $\theta_A > \theta_B$.

In the tire of the present invention, it is preferred that the angle $\theta_A$ formed by the groove wall of the tire width-direction outer end of the first inclined groove with respect to the direction perpendicular to the tire surface, be in a range of 40° to 50°, and that the angle $\theta_B$ formed by the groove wall of the tire width-direction inner end of the short groove with respect to the direction perpendicular to the tire surface, be in a range of 15° to 25°. Further, in the tire of the present invention, it is preferred that a tire width-direction distance between the tire width-direction outer end of the first inclined groove and the tire width-direction inner end of the short groove be in a range of 7 to 13% of a tread half width TW/2.

Effects of the Invention

According to the present invention, a motorcycle pneumatic tire in which the wet grip performance during turning is improved while ensuring the steering stability during turning can be provided.

MODE FOR CARRYING OUT THE INVENTION

Embodiments of the present invention will now be described in detail referring to the drawings.

Figure 1:
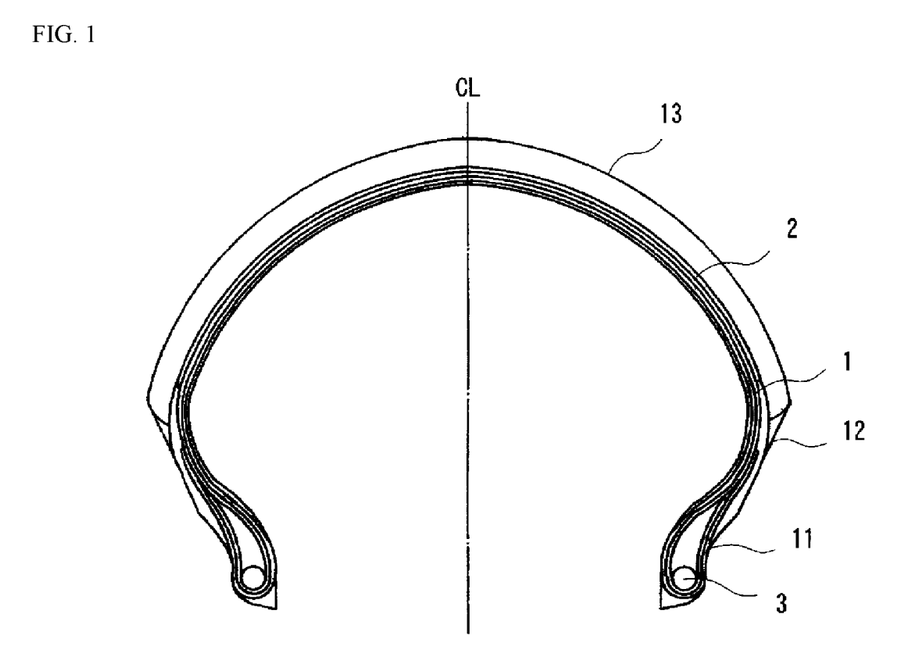
FIG. 1 is a widthwise cross-sectional view illustrating a motorcycle pneumatic tire of the present invention.

FIG. 1 is a widthwise cross-sectional view illustrating a motorcycle pneumatic tire of the present invention. The illustrated motorcycle pneumatic tire includes: a pair of bead portions 11; a pair of side wall portions 12 continuously extending on the respective bead portions; and a tread portion 13 toroidally extending between the side wall portions 12. The illustrated motorcycle pneumatic tire also includes: at least one (e.g., 1 or 2) carcass 1 which reinforces the above-described portions between the pair of the bead portions 11; and at least one (e.g., 1 or 2) belt layer 2 which is arranged on a tire radial-direction outer side of the carcass 1 and is formed by spirally winding a reinforcing cord in a circumferential direction.

Figure 2:
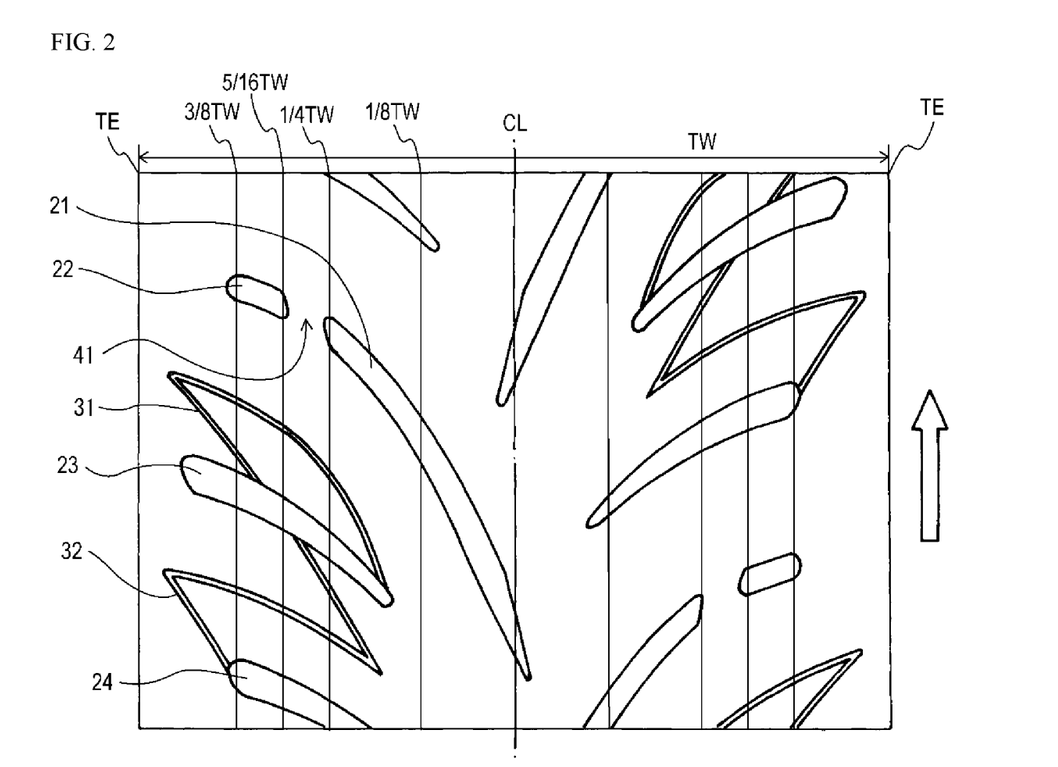
FIG. 2 is a partial development view illustrating one example of a tread pattern of a motorcycle pneumatic tire of the present invention.

FIG. 2 is a partial development view illustrating one example of a tread pattern of a motorcycle pneumatic tire of the present invention. The illustrated tread pattern is a directional pattern that has a designated rotation direction when mounted on a motorcycle. An arrow in FIG. 2 represents the rotation direction of the tire.

Figure 3:
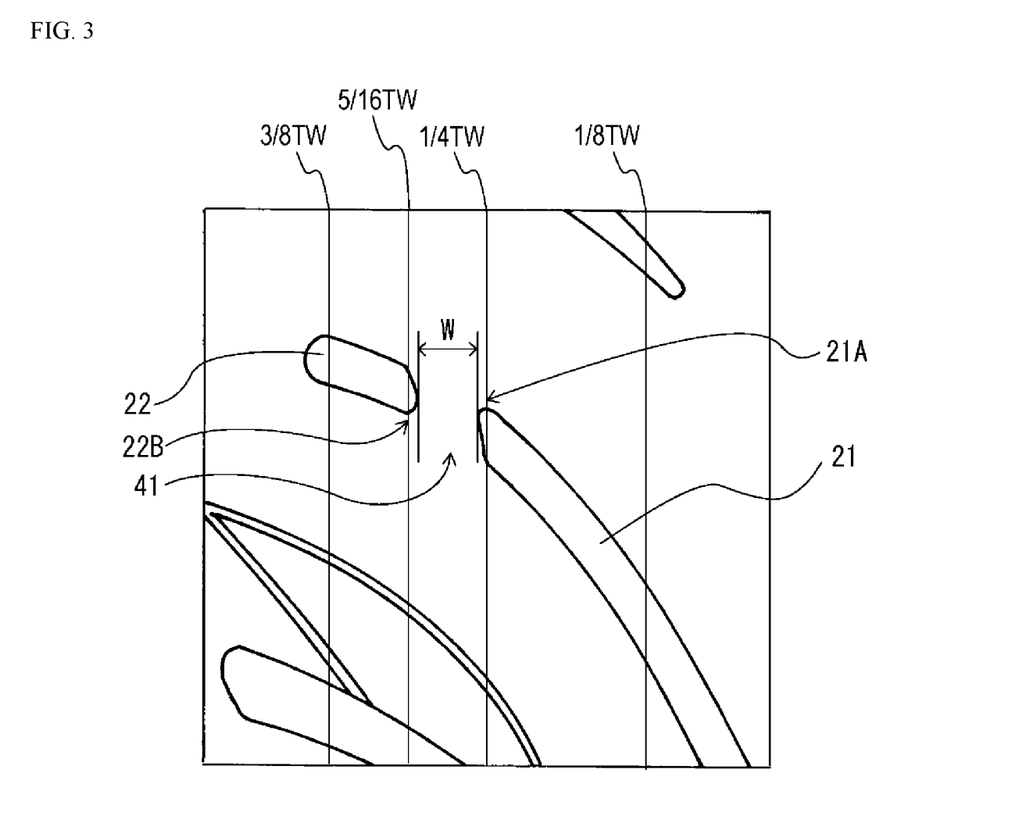
FIG. 3 is an enlarged view illustrating the vicinity of a first inclined groove and a short groove arranged on the extension of the first inclined groove.

As illustrated, in the tire of the present invention, a first inclined groove 21, which extends on a tire width-direction outer side from the vicinity of a tire equator CL and is inclined in the same direction as the tire rotation direction, and a short groove 22, which is arranged on an extension of a tire width-direction outer end of the first inclined groove 21, are arranged on the tire ground-contact surface. FIG. 3 is an enlarged view illustrating the vicinity of the first inclined groove 21 and the short groove 22 arranged on the extension of the first inclined groove 21. By arranging the short groove 22 on the extension of the first inclined groove 21, an effect of improving the drainage performance of a shoulder portion can be obtained. The reason for arranging the short groove 22 on the extension of the first inclined groove 21 is also because, for example, when the short groove 22 is displaced on either side of the tire circumferential direction and is thus not on the extension of the first inclined groove 21, the rigidity fluctuates and cracking occurs, causing vibration during running.

In the present invention, a tire width-direction outer end 21A of the first inclined groove 21 is positioned in the vicinity of a point at ¼ of a tread width TW from the tire equator CL on the tire width-direction outer side, and a tire width-direction inner end 22B of the short groove 22 is positioned in a range of ¼ to 5/16 of the tread width TW from the tire equator CL on the tire width-direction outer side. It is noted here that the phrase "the tire width-direction outer end 21A of the first inclined groove 21 is positioned in the vicinity of a point of ¼ of the tread width TW from the tire equator CL on the tire width-direction outer side" means that the tire width-direction outer end 21A of the first inclined groove 21 exists in a range of ±5% of the tread width TW, being centered at the above-described point of ¼. Further, in the present invention, the term "tread width TW" means a tire width-direction distance between tread ends TE, which is measured along the ground-contact surface in a state where the tire is fitted to an application rim and inflated to a prescribed internal pressure with no load. The term "application rim" used herein refers to a rim defined by an industrial standard that is valid in each region where the tire is manufactured and used, and the term "prescribed internal pressure" refers to an air pressure that corresponds to the maximum load capacity at the application size prescribed in the industrial standard. The "industrial standard" is, for example, JATMA YEAR BOOK of Japan Automobile Tyre Manufacturers Association (JATMA) in Japan, STANDARD MANUAL of The European Tyre and Rim Technical Organisation (ETRTO) in Europe, or YEAR BOOK of The Tire and Rim Association, Inc. (TRA) in the U.S.

As described above, the drainage performance of a shoulder portion can be improved by arranging the short groove 22 on the extension of the first inclined groove 21; however, when a land portion 41 between the first inclined groove 21 and the short groove 22 is too close to the shoulder side, the lateral rigidity during turning of the motorcycle cannot be obtained sufficiently. Therefore, in the present invention, the positions of the tire width-direction outer end 21A of the first inclined groove 21 and the tire width-direction inner end 22B of the short groove 22 are defined as described above, whereby the land portion 41 is positioned in the range of ¼ to 5/16 of the tread width TW from the tire equator CL on the tire width-direction outer side, which range where the land portion 41 frequently comes in contact with the ground during turning of the motorcycle. By this, a high lateral rigidity can be ensured during turning of the motorcycle.

In the present invention, the first inclined groove 21 is arranged such that, as illustrated, the inclination angle thereof with respect to the tire circumferential direction increases toward the tire width-direction outer side. By this, an effect of ensuring the rigidity and the drainage performance in the vicinity of the tire equator CL as well as the lateral rigidity in the tire shoulder portions can be attained.

Figure 4:
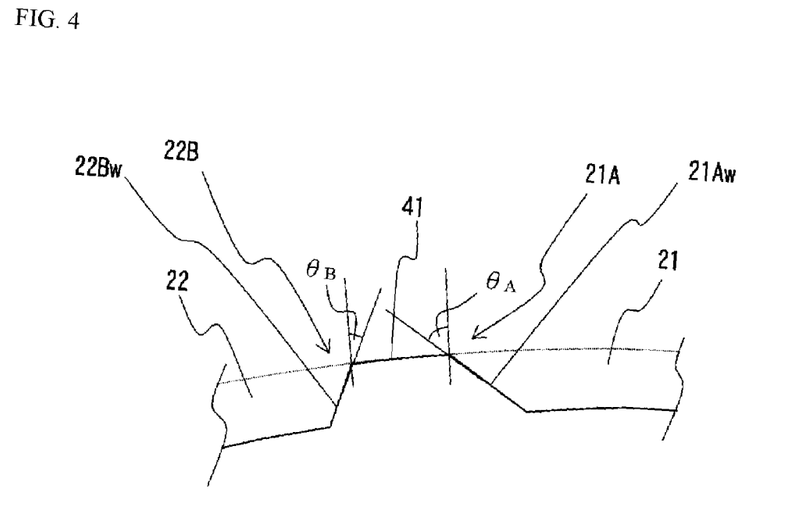
FIG. 4 is a schematic cross-sectional view taken along the extending direction of the first inclined groove and the short groove arranged on the extension of the first inclined groove.

FIG. 4 is a schematic cross-sectional view taken along the extending direction of the first inclined groove 21 and the short groove 22 arranged on the extension of the first inclined groove 21. As illustrated, in the present invention, an angle $\theta_A$ formed by a groove wall 21Aw of the tire width-direction outer end 21A of the first inclined groove 21 with respect to the direction perpendicular to the tire surface, and an angle $\theta_B$ formed by a groove wall 22Bw of the tire width-direction inner end 22B of the short groove 22 with respect to the direction perpendicular to the tire surface, satisfy a relationship of $\theta_A > \theta_B$. By this, the lateral rigidity during turning of the motorcycle can be ensured and the drainage performance can be improved, both at a higher level.

Therefore, according to the present invention, by arranging the first inclined groove 21 and the short groove 22 that have the above-described constitutions on the ground-contact surface, a motorcycle pneumatic tire in which the wet grip performance during turning of a motorcycle is improved by enhancing the drainage performance, while the lateral rigidity is ensured by securing the steering stability during turning of the motorcycle, can be realized.

From the standpoint of the balance between the lateral rigidity and the drainage performance, the angle $\theta_A$ formed by the groove wall 21Aw of the tire width-direction outer end 21A of the first inclined groove 21 with respect to the direction perpendicular to the tire surface, is in a range of preferably 40° or larger, more preferably 42° or larger, but preferably 50° or smaller, more preferably 48° or smaller, and the angle $\theta_B$ formed by the groove wall 22Bw of the tire width-direction inner end 22B of the short groove 22 with respect to the direction perpendicular to the tire surface is in a range of preferably 15° or larger, more preferably 17° or larger, but preferably 25° or smaller, more preferably 23° or smaller.

Further, in the present invention, a tire width-direction distance w between the tire width-direction outer end 21A of the first inclined groove 21 and the tire width-direction inner end 22B of the short groove 22 is preferably in a range of 7% or greater, particularly 8% or greater, but 13% or less, particularly 12% or less, of the tread half width TW/2. By controlling the tire width-direction distance w between the tire width-direction outer end 21A of the first inclined groove 21 and the tire width-direction inner end 22B of the short groove 22 to be in the above-described range, the wet grip performance during turning of the motorcycle can be ensured more certainly. It is noted here that the distance w is a value measured in the same manner as the tread width TW.

Moreover, in the present invention, when the tread width TW is equally divided in eight, it is preferred that, among the thus equally-divided eight regions, the regions of ⅛ to ¼ and ¼ to ⅜ of the tread width TW from the tire equator CL on the tire width-direction outer side have the largest number of grooves arranged on the ground-contact surface. By setting the number of grooves to be the largest in these regions, the pattern rigidity on the inner side of the ground-contact surface is reduced during turning of the motorcycle as compared to the pattern rigidity on the outer side of the ground-contact surface; therefore, the shearing force in slippery regions is dispersed, whereby an effect of improving the wet grip performance can be obtained.

In the present invention, the number of grooves included in each region is determined by measuring the tire width-direction distance between the tire widthwise ends of each groove in each region and counting the number of grooves that are included across 70% or more of the tire width direction of each region. Further, in the present invention, the term "groove" refers to a groove having a maximum groove width of not less than 2 mm or a maximum groove depth of not less than 2 mm, and the term does not encompass, for example, such a shallow groove whose maximum groove width or maximum groove depth does not satisfy the above-described range. In the present invention, the term "groove width" refers to the width of an opening at a cross-section perpendicular to the extending direction of the groove of interest.

As illustrated, in the tire of the present invention, in addition to the first inclined groove 21 and the short groove 22, a second inclined groove 23 and a third inclined groove 24, each of which extends from the tire width-direction inner side toward the tire width-direction outer side and is inclined in the same direction as the tire rotation direction, may be arranged on the tire ground-contact surface. As illustrated, together with the first inclined groove 21 and the short groove 22, the second inclined groove 23 and the third inclined groove 24 may be arranged at substantially equal intervals along the tire circumferential direction, and their inclination angles with respect to the tire circumferential direction increase toward the tire width-direction outer side in the same manner as the first inclined groove.

In the tire of the present invention, as illustrated, decorative grooves 31 and 32 may be arranged in addition to the first to the third inclined grooves. In the present invention, the term "decorative groove" refers to a groove having a narrow width and a shallow depth, such as a groove that has a maximum groove width of 0.1 mm or larger, preferably 0.5 mm or larger, but less than 2.0 mm, preferably 1.5 mm or less, and a maximum groove depth of 0.1 mm or greater, preferably 0.2 mm or greater, but less than 2.0 mm, preferably 0.5 mm or less. By arranging decorative grooves having a groove width and a groove depth in the above-described respective ranges on the tire ground-contact surface, the drainage performance of the tire in the early stage of use can be improved.

In the present invention, the arrangement pitch of the inclined grooves and the decorative grooves is not particularly restricted and, for example, the arrangement pitch may be about ¹/₁₅ to ¹/₂₂ of the whole circumferential length of the tire. Further, in the present invention, the positions of the inclined grooves and the decorative grooves along the tire circumferential direction may be arranged alternately to be shifted, for example, by ½ to ⅓ of the arrangement pitch on one side and the other side of the ground-contact surface sandwiching the tire equatorial plane CL.

In the tire of the present invention, it is important that the arrangement conditions of the grooves provided on the tire ground-contact surface be defined as described above, and this enables to attain the expected effects. The details of other tire structures, materials to be used and the like are not particularly restricted and, for example, the tire of the present invention can be configured as follows.

As the belt layer 2, a spiral belt formed by spirally winding an elongated rubber-coated cord obtained by coating a single reinforcing cord with a rubber or a strip-form ply obtained by coating plural reinforcing cords with a rubber and whose cord direction is substantially the same as the tire circumferential direction, can be used. Alternatively, the belt layer 2 may be composed of two or more inclined belt layers that are arranged such that their cord directions intersect with each other between the layers. The reinforcing cord(s) can be selected as appropriate from steel cords, cords made of organic fibers, such as fibers of aromatic polyamide (aramid, e.g., trade name "KEVLAR (registered trademark)" manufactured by DuPont (trademark)), polyethylene naphthalate (PEN), polyethylene terephthalate (PET), rayon, ZYLON (registered trademark) (poly-p-phenylene benzobisoxazole (PBO) fiber) or aliphatic polyamide (nylon), and cords made of glass fibers, carbon fibers or the like. From the standpoint of ensuring the wear life and the high-speed durability at high levels, it is preferred to use a steel cord.

Further, for example, as illustrated, in the tire of the present invention, bead cores 3 are each embedded in the pair of the bead portions 11, and the carcass 1 is folded around the bead cores 3 from the inside to the outside of the tire and thereby anchored. The ends of the carcass 1 may each be sandwiched from both sides and anchored by bead wires, although this is not illustrated in the drawing. Moreover, an inner liner (not illustrated) is formed as an innermost layer of the tire of the present invention.

The tire of the present invention can be applied as both a front tire and a rear tire of a motorcycle, and the tire of the present invention is particularly suitable as a front tire and may be applied as a tire having either a radial structure or a bias structure.

EXAMPLES

The present invention will now be described in more detail by way of prophetic Examples thereof.

Example 1

In accordance with the conditions shown in the table below, a motorcycle pneumatic radial tire of Example 1 having the cross-sectional structure and the tread pattern as illustrated in FIGS. 1 and 2 is produced at a tire size of MCR120/70ZR17M/C. The carcass 1 is provided in two layers, and rayon is used as a reinforcing cord. Further, as the belt layer 2, a mono-spiral belt obtained by spirally winding a rubber-coated steel cord is used.

In the tire of Example 1, a first inclined groove extending on the tire width-direction outer side from the vicinity of the tire equator and being inclined in the same direction as the tire rotation direction, and a short groove arranged on the extension of the tire width-direction outer end of the first inclined groove are provided on the tire ground-contact surface. In addition, the tire width-direction outer end of the first inclined groove is positioned in the vicinity of a point at ¼ of the tread width TW from the tire equator on the tire width-direction outer side, and the tire width-direction inner end of the short groove is positioned in a range of ¼ to 5/16 of the tread width TW from the tire equator on the tire width-direction outer side.

Motorcycle pneumatic radial tires of other Examples and Comparative Examples are produced by changing the conditions as shown in the tables below. It is noted here that the ratio of the tire width-direction distance (w) between the tire width-direction outer end of the first inclined groove and the tire width-direction inner end of the short groove with respect to the tread half width (TW/2) is set to be 10% in all of the tires.

The thus obtained prophetic test tires are each designed to be fitted to a rim having a size of MT5.5×17, mounted on a 1,000-cc motorcycle as its front tire, and then inflated to an internal pressure of 250 kPa. As the rear tire, a commercially available tire having a size of MCR180/55ZR17M/C is used.
(Steering Stability During Turning)

For each of the prophetic test tires, the results thereof for a dry surface are indicated as an index, taking the evaluation of Comparative Example 1 as 100. A larger numerical value means a superior and more favorable steering stability.
(Wet Grip Performance During Turning)

For each of the prophetic test tires, the results thereof for a wet surface are indicated as an index, taking the evaluation of Comparative Example 1 as 100. A larger numerical value means a superior and more favorable wet grip performance.

The results of the above-described evaluations are shown together in the tables below.

TABLE 1

|  | Example 1 | Example 2 | Example 3 | Example 4 | Example 5 |
| --- | --- | --- | --- | --- | --- |
| Position of short groove | On extension of first inclined groove | On extension of first inclined groove | On extension of first inclined groove | On extension of first inclined groove | On extension of first inclined groove |
| Angle of groove wall of outer end of first inclined groove, $\theta_A$ (°)*1 | 45 | 40 | 50 | 45 | 45 |
| Angle of groove wall of inner end of short groove, $\theta_B$ (°)*2 | 20 | 20 | 20 | 15 | 25 |
| Steering stability during turning (index) | 110 | 108 | 112 | 108 | 112 |
| Wet grip performance during turning (index) | 110 | 112 | 108 | 112 | 108 |

*1 An angle formed by the groove wall of the tire width-direction outer end of the first inclined groove with respect to the direction perpendicular to the tire surface
*2 An angle formed by the groove wall of the tire width-direction inner end of the short groove with respect to the direction perpendicular to the tire surface

TABLE 2

|  | Comparative Example 1 | Comparative Example 2 | Comparative Example 3 | Comparative Example 4 | Comparative Example 5 |
| --- | --- | --- | --- | --- | --- |
| Position of short groove | Out of extension of first inclined groove | none | On extension of first inclined groove | On extension of first inclined groove | On extension of first inclined groove |

TABLE 2-continued

|  | Comparative Example 1 | Comparative Example 2 | Comparative Example 3 | Comparative Example 4 | Comparative Example 5 |
|---|---|---|---|---|---|
| Angle of groove wall of outer end of first inclined groove, $\theta_A$ (°)*1 | 45 | 45 | 20 | 45 | 20 |
| Angle of groove wall of inner end of short groove, $\theta_B$ (°)*2 | 20 | 20 | 45 | 45 | 20 |
| Steering stability during turning (index) | 100 | 110 | 110 | 95 | 98 |
| Wet grip performance during turning (index) | 100 | 95 | 95 | 110 | 105 |

*1 An angle formed by the groove wall of the tire width-direction outer end of the first inclined groove with respect to the direction perpendicular to the tire surface
*2 An angle formed by the groove wall of the tire width-direction inner end of the short groove with respect to the direction perpendicular to the tire surface As shown in the tables above, it was confirmed that, in prophetic Examples, the wet grip performance during turning is improved while the steering stability during turning is ensured.

DESCRIPTION OF SYMBOLS

1: carcass
2: belt layer
3: bead core
11: bead portion
12: side wall portion
13: tread portion
21: first inclined groove
21A: tire width-direction outer end of first inclined groove
21Aw: groove wall of tire width-direction outer end of first inclined groove
22: short groove
22B: tire width-direction inner end of short groove
22Bw: groove wall of tire width-direction inner end of short groove
23: second inclined groove
24: third inclined groove
31, 32: decorative groove
41: land portion
TE: tread end

The invention claimed is:

1. A motorcycle pneumatic tire comprising:
a pair of bead portions;
a pair of side wall portions continuously extending on the respective bead portions;
a tread portion toroidally extending between the side wall portions;
at least one carcass reinforcing the respective portions between the pair of the bead portions; and
a designated rotation direction when mounted on a motorcycle, wherein
the motorcycle pneumatic tire further comprises, on its ground-contact surface: a first inclined groove extending on a tire width-direction outer side from the vicinity of a tire equator and being inclined in the same direction as the tire rotation direction, the entire first inclined groove is inclined in the same direction as the tire rotation direction; and a short groove arranged on an extension of a tire width-direction outer end of the first inclined groove, the short groove being shorter in the tire width direction than the first inclined groove,
the tire width-direction outer end of the first inclined groove is positioned in the vicinity of a point at ¼ of a tread width TW from the tire equator on the tire width-direction outer side, while a tire width-direction inner end of the short groove is positioned in a range of ¼ to ⁵⁄₁₆ of the tread width TW from the tire equator on the tire width-direction outer side,
an inclination angle of the first inclined groove with respect to a tire circumferential direction increases toward the tire width-direction outer side,
the tire width-direction outer end of the first inclined groove including a leading wall, a trailing wall, and a connecting wall connecting the leading wall and the trailing wall;
the tire width-direction inner end of the short groove including a leading wall, a trailing wall, and a connecting wall connecting the leading wall and the trailing wall and
an angle $\theta_A$ formed by the connecting wall of the tire width-direction outer end of the first inclined groove with respect to the direction perpendicular to the tire surface, and an angle $\theta_B$ formed by the connecting wall of the tire width-direction inner end of the short groove with respect to the direction perpendicular to the tire surface, satisfy a relationship of $\theta_A > \theta_B$.

2. The motorcycle pneumatic tire according to claim 1, wherein
the angle $\theta_A$ formed by the connecting wall of the tire width-direction outer end of the first inclined groove with respect to the direction perpendicular to the tire surface, is in a range of 40° to 50°, and
the angle $\theta_B$ formed by the connecting wall of the tire width-direction inner end of the short groove with respect to the direction perpendicular to the tire surface, is in a range of 15° to 25°.

3. The motorcycle pneumatic tire according to claim 1, wherein a tire width-direction distance between the tire width-direction outer end of the first inclined groove and the tire width-direction inner end of the short groove is in a range of 7 to 13% of a tread half width TW/2.

4. The motorcycle pneumatic tire according to claim 2, wherein a tire width-direction distance between the tire width-direction outer end of the first inclined groove and the tire width-direction inner end of the short groove is in a range of 7 to 13% of a tread half width TW/2.

5. The motorcycle pneumatic tire according to claim 1, wherein when the tread width TW is equally divided into eight equal regions, the region from ⅛ to ¼ of the tread width TW from the tire equator CL on the tire width-direction outer side and the region from ¼ to ⅜ of the tread width TW from the tire equator CL on the tire width-direction outer side have the largest number of grooves arranged on the ground-contact surface.

6. The motorcycle pneumatic tire according to claim 1, further comprising a second inclined groove and a third inclined groove, each of the second inclined groove and the third inclined groove extends from the tire width-direction inner side toward the tire width-direction outer side, is inclined in the same direction as the tire rotation direction, is arranged on the tire ground-contact surface, and has an inclination angle with respect to the tire circumferential direction that increase toward the tire width-direction outer side.

7. The motorcycle pneumatic tire according to claim 6, wherein an arrangement pitch of the inclined grooves is $1/15$ to $1/22$ of a whole circumferential length of the tire.

8. The motorcycle pneumatic tire according to claim 6, further comprising a decorative groove, the decorative groove has a maximum groove depth of 0.2 to 0.5 mm.

* * * * *